Patented June 10, 1952

2,600,361

UNITED STATES PATENT OFFICE 2,600,361

PREVENTION OF FOAMING IN STEAM GENERATION

Lewis O. Gunderson, Park Ridge, Ill., assignor to Dearborn Chemical Company, Chicago, Ill., a corporation of Illinois No Drawing. Application June 9, 1948, Serial No. 32,042

15 Claims. (Cl. 252—321)

This invention relates to methods for conditioning water and, more particularly, for eliminating foaming conditions in water boiled under atmospheric or subatmospheric pressure.

Foaming of boiling water is not, as commonly thought, equivalent to an accumulation of foam on top of the surface of the boiling water as may occur, for instance, when soap solutions are agitated. The foam or froth obtainable by blowing air through or stirring a soap solution accumulates on top of the water surface and presents a distinct water-froth interface. Such froth is the result of an equilibrium arrived at after a considerable time as a result of the interplay of various factors such as surface tension, forces tending to establish a more or less organized surface layer, preferential absorption and the like, and their interaction leads to the formation of relatively stable froth.

The foaming of boiling water, on the other hand, is due to the formation of a large number of relatively small steam bubbles having the property of resistance to coalescence while rising through the boiling water. The formation of such a large number of relatively small bubbles tends to expand the boiling water, without necessarily effecting the formation of a layer of stable froth on top of the boiling water. Further, a water that forms a froth on agitation or blowing of air therethrough does not necessarily or always foam or expand on boiling.

I have now found that foaming or expansion in the boiling of water may be prevented by incorporation with the water of relatively small amounts of a polyalkylene polyamine having its primary amine groups acylated with a higher fatty acid of at least twelve carbon atoms and having at least one intermediate amino group acylated with a lower fatty acid of from two to ten carbon atoms. The polyethylene polyamines so poly-acylated both with higher and lower fatty acids are particularly effective foaming inhibitors.

There is a special advantage in acylating the primary amino groups of a polyalkylene polyamine with a high molecular weight carboxylic acid containing at least twelve carbon atoms and then further reacting the reaction product with a short chain fatty acid of only two carbon atoms. In the case of fatty acids having only two carbon atoms, such as acetic acid, or glycolic acid, such further reaction renders the resulting mixed polyamide compounds water-soluble or water-dispersible under atmospheric conditions, thus making the compound particularly adaptable for foam inhibition of aqueous solutions under atmospheric pressure and at relatively low temperatures at or below the normal boiling point of water. Solubilization may also be due, in part, to the formation of amide salts with the acetic or glycolic acid used.

It is therefore an important object of the present invention to provide a novel method for the prevention of foaming or expansion in aqueous systems by the use of polyalkylene polyamines acylated in the primary amine groups with a higher fatty acid and further reacted with a lower fatty acid to render the product more readily dispersible in the aqueous system.

Another important object of the present invention is to provide a method for treating water to prevent foaming or expansion on boiling and including the step of incorporating with said water a solubilized or dispersible compound of the type indicated hereinabove.

Other and further objects and features of the present invention will become apparent from the following description and appended claims.

A differentiation may be made between the terms "foam inhibition" and "defoaming," whereby "foam inhibition" might cover instances where a compound or substance when added to a liquid inhibits the initiation of foam formation, and "defoaming" applies where a compound is added to a solution already in a foaming condition, to effectively destroy or collapse such foam. Some compounds often are effective only as defoaming agents, that is, foam destroyers, while others act as true foam inhibitors, preventing even the initial formation of foam, while still other compounds can act as both defoamers and foam inhibitors. Many of the compounds described herein act as both defoamers and foam inhibitors. This is especially true of the solubilized foam inhibiting compounds which are colloidally soluble or dispersible in water, thus making them very attractive for commercial application.

The organic compounds to which the present invention particularly relates comprise acylation products of polyethylene polyamines such as diethylene triamine, triethylene tetramine, tetraethylene pentamine, and of other polyalkylene polyamines such as dipropylene triamine, tripropylene tetramine, di-isopropylene triamine, tri-isopropylene tetramine, dibutylene triamine and the like. I may also employ compounds obtained as a result of the condensation of two mols of a polyalkylene polyamine such as triethylene tetramine with one mol of a dibasic carboxylic acid such as succinic acid. These polyalkylene polyamine compounds are condensed with fatty acids containing at least 12, and preferably at least 16, carbon atoms. Such fatty acids may be substituted or unsubstituted, straight chain or branched, saturated or unsaturated. By the term "fatty acid" I mean also to include those carboxylic acids that have closely similar properties, such as naphthenic acid and the acids obtained by the oxidation of hydrocarbons, in particular, petroleum hydrocarbons. These acylating compounds may be substituted with aromatic radicals, or the resulting polyalkylene polyamide compounds may comprise in part high molecular weight fatty acids and in part high molecular weight aromatic acids and/or aliphatic cyclic acids. Examples of such acylating acids are oleic acid, stearic acid, palmitic acid, erucic acid, linoleic acid, linolenic acid, ricinoleic acid, esterified ricinoleic acid, monohydroxy stearic acid, dihydroxy stearic acid, cetyloxbutyric acid, behenic acid, keto-hydroxy stearic acid, lauric acid, and the various aldehyde acids which may be prepared from ricinoleic acid. Methods for preparing the last-mentioned aldehyde acids are disclosed, for instance, in the United States patents to Colbeth No. 2,058,568 and No. 2,126,368.

The high molecular weight polyamides may be prepared by condensing a polyalkylene polyamine with a fatty acid or a derivative thereof, such as an ester, anhydride or halide thereof, in such proportions and under such conditions as to effect acylation of the primary amino groups present in the polyalkylene polyamines. The fatty glycerides are good acylating agents, for instance, tallow coconut oil, lard oil, cottonseed oil, peanut oil, soybean oil, castor oil, whale oil, sardine oil, and the like. In general, condensation may be carried out by simply heating a polyalkylene polyamine with a fatty acid, a fatty glyceride, or a chloride of a fatty acid, with one or more molecular proportions of fatty acids for each molecular proportion of the polyalkylene polyamine. The heating may be carried out for several hours (from one and a half to six or more) at about 140° C. upwardly.

In the preparation of water dispersible or colloidally soluble foam inhibiting polyamides, the high molecular weight diamide, or polyamide, of a polyethylene polyamine such as distearoyl triethylenetetramine may be prepared by condensing one mol of the amine with either one or two mols of the acid, since I have found that in each case a preponderant yield of the diamide is obtained. My experience has shown that the acylation of one of the primary amino groups of a polyethylene polyamine induces the preferential acylation of the other primary amino group in the molecule leaving unreacted polyamine molecules in the reaction product. Therefore, it is essential for optimum results in order to produce a solubilized polyamide that sufficient low molecular weight acid, e. g., acetic acid, or glycolic acid, be introduced into the reaction product to insure that one or more of the secondary amino groups of the diamide or polyamide becomes acylated, although a lesser amount will produce appreciable solubilization of the high molecular weight polyamide by salt formation and/or other undetermined mechanism.

For the preparation of a triacylated or higher acylated compound from polyalkylene polyamines containing two or more secondary amino groups, a temperature of 175° C. or higher is preferred.

From these polyalkylene polyamides of higher fatty acids prepared as described hereinabove, I may prepare compositions of the present invention by reacting the polyalkylene polyamides with a lower fatty acid (containing from 2 to 10 carbon atoms) under appropriate conditions and for a sufficient period of time to introduce at least one, and preferably more than one, lower molecular weight acyl group into the polyalkylene polyamide of a higher fatty acid. Examples of such lower molecular weight acylating agents are acetic acid, glycolic acid, lactic acid, propionic acid, butyric acid, caproic acid, heptylic acid, caprylic acid, and esters, anhydrides and halides of such acids. One or more molecular proportions of a lower molecular weight fatty acid or a derivative thereof may be used for each mol of a polyalkylene polyamide. The reaction temperature, when free acids are used, may range from 130° C. upwardly, and the reaction period may range from 2 to 10 or more hours.

It should be understood that, if desired, acylation may be carried out simultaneously with both higher and lower fatty acids, the polyalkylene polyamine being reacted with a mixture of both higher and lower fatty acids for an appropriate period of time under suitable conditions.

The methods and compositions of the present invention are illustrated by examples given hereinbelow.

*Example I*

57 gr. stearic acid and 19 gr. tetraethylene pentamine were heated together at from 140° to 180° C. for 8 hours, yielding a light brown hard wax soluble in water, neutral to phenolphthalein and characterized by a saponification number of 4.65. 64.7 gr. of the resulting product were heated with 14 gr. acetic anhydride for 5 hours at from 143° to 170° C., yielding 76.6 gr. of a hard wax which could be ground to a fine powder having a chocolate color. This powder was found to be soluble in ethanol, acetone and toluene and could be recrystallized from petroleum ether and from acetic anhydride. One gram of the product could be dissolved in 10 cc. of water by warming to form a thick, soapy solution which presented a silky colloidal appearance when diluted. When an aqueous dispersion of the final product was warmed with a barium chloride solution, a colloidal, translucent solution was formed.

The efficiency of the resulting compound as a foam inhibitor was determined as follows:

A foaming solution was prepared by adding to 1 liter distilled water ½ gr. CaSO$_4$.2H$_2$O, 2 gr. anhydrous Na$_2$CO$_3$ and 3 gr. anhydrous Na$_2$SO$_4$. 1000 cc. of the resulting foaming water were placed in a laboratory boiler operating under 200 lb. per sq. in. pressure. 1 milligram of the compound dissolved in alcohol when added to the water inhibited foaming in the boiler for 55 minutes.

*Example II*

8.8 gr. soybean oil were heated with 2 gr. tetraethylene pentamine for 4 hours at from 150° C. to 170° C. The resulting product was first heated with 0.4 gr. acetic anhydride for 2¼ hours at 112° to 142° C. Then 0.2 gr. of acetic acid was added, and the mixture was kept at 122° to 160° for 1½ hours, yielding, as a final product, 4.6 gr. of a thick, clear, dark brown oil.

When tested under 200 lb. per sq. in. pressure, as described hereinabove, 1 milligram of the final product dissolved in alcohol was found to inhibit foaming for 32 minutes.

*Example III*

1053 gr. soybean oil and 340 gr. tetraethylene pentamine were heated for 8½ hours at about 150° C., yielding 1371 gr. of a viscous, amber colored, almost clear oil. 1300 gr. of this oil were heated with 172 gr. acetic anhydride for 4 hours at about 150° C., yielding 1446 gr. of an oil which was slightly darker, slightly more viscous, and a little clearer than the first reaction product. The final product was characterized by an acid number of 29.8 and formed, on addition of 1 gr. to 10 cc. distilled water, a lemon colored, thick, soapy solution. 1 gr. dissolved in 50 cc. distilled water had a pH of 5.0.

The efficiency of the resulting compound as a foam inhibitor under atmospheric conditions was determined as follows. A salt solution was prepared by adding to 500 cc. distilled water 40.5 gr. NaCl, 6 gr. $MgCl_2$, 6 gr. $MgSO_4.7H_2O$ and 2.25 gr. $CaSO_4.2H_2O$. This solution was brought to a boil under atmospheric pressure and ¼ part per million of the compound to be tested was added to the foaming solution in the form of a solution in carbon tetrachloride. Foaming was prevented for over 35 minutes.

When tested under 200 lb. per sq. in. pressure in a foaming solution, as described in Example I, the addition thereto of one milligram dissolved in alcohol prevented foaming for 5 minutes.

Example IV 1053 gr. soybean oil were heated with 351 gr. tetraethylene pentamine for 8 hours at around 150° C., yielding 1402 gr. of an almost clear, light brown, viscous oil. 1300 gr. of this oil were heated with 263 gr. acetic anhydride for 4 hours at from 100 to 160° C., yielding 1550 gr. of a clear brown oil characterized by an acid number of 61.5. One gram of this oil was found to be dispersible in 10 cc. distilled water to form a yellow, thick, foaming dispersion. One gram of the oil when dissolved in 50 cc. of water yielded a dispersion having a pH of 4.5.

The final product was found to inhibit foaming for 40 minutes when tested under 200 lb. per sq. in. pressure, as described in Example I.

Example V 1096 gr. soybean oil were heated with 244 gr. tetraethylene pentamine for 8 hours at from 140° to 160° C., yielding 1333 gr. of a clear, light brown viscous oil having a saponification number of 5.56. 1300 gr. of this oil were heated with 127 gr. acetic anhydride for 4 hours at from 108° to 168° C., yielding 1424 gr. of a dark brown, clear, viscous oil having an acid number of 32.1. 1 gr. of this oil could be dispersed in 10 cc. distilled water to form a very thick, soapy, yellow solution. 1 gr. of the oil dispersed in 50 cc. of distilled water yielded a dispersion having a pH of 4.5.

The final product was tested as a foam inhibitor under 200 lb. per sq. in. pressure, as described in Example I, and found to inhibit foaming for 38 minutes. When tested under atmospheric pressure, as described in Example III, the product inhibited foaming for 30 minutes.

Example VI 1134 gr. of tetraethylene pentamine were heated with 360 gr. acetic acid at 140° C. for 3 hours under reduced pressure. 1704 gr. stearic acid was then added to the reaction mass, and ½ of the reaction mass was heated with another 1704 gr. of stearic acid under reduced pressure at from 180° to 190° C. for 50 hours. At this time 47.2 gr. of tetraethylene pentamine were added, and heating was continued for another 25 hours at from 180° to 190° C. under reduced pressure. The product thus obtained contained 5.3% free acid, calculated as stearic acid, and weighed 6.5 lbs. When tested under 200 lb. per sq. in. pressure, as described in Example I, the compound inhibited foaming for 25 minutes.

Example VII 58.5 gr. soybean oil, 19.5 gr. tetraethylene pentamine, and 15.8 gr. acetic anhydride were heated together at from 141° to 158° C. for 8 hours. The resulting product consisted of 92.8 gr. of a brown mixture of an oil and a paste characterized by an acid number of 16.5. One gr. of the product could be dispersed in 10 cc. of distilled water to form a muddy dispersion. On standing, a partial separation of the dispersion was noted.

When tested as a foam inhibitor under atmospheric pressure, in the manner described in Example III, the composition was found to inhibit foaming for more than 30 minutes.

Example VIII 293.3 gr. of tetraethylene pentamine and 847.5 gr. of stearic acid were heated for 8 hours at from 137° to 155° C. to yield a hard, deep yellow wax weighing 1093.2 gr. 1050 gr. of this wax were heated with 227 gr. acetic anhydride for 4½ hours at from 95° to 145° C. The final product was a dark brown hard brittle wax weighing 1272.1 gr. and having an acid number of 86.4. One gram of this wax could be dispersed in 10 cc. distilled water to form a tan colored, stiff, soapy dispersion. One gram of the wax could be dispersed in 50 cc. of distilled water to form a viscous, silky, cream colored dispersion having a pH of 3.97. The final product, when tested under 200 lb. per sq. in. pressure, in the manner described in Example I, was found to inhibit foaming for 40 minutes.

Example IX 19.5 gr. tetraethylene pentamine were heated with 84.8 gr. stearic acid for 8 hours at from 138° to 158° C., yielding 99.7 gr. of a brown wax having an acid number of 20.5. 97.7 gr. of this wax were heated with 10.3 gr. acetic anhydride at from 141° to 151° C. for 4½ hours. The final product amounted to 105.8 gr. of a dark brown, brittle wax having an acid number of 64.6.

When tested under 200 lb. per sq. in. pressure, as described in Example I, the final product was found to inhibit foaming for 9 minutes.

Example X 292.3 gr. tetraethylene pentamine and 813.2 gr. stearic acid were heated for 8 hours at 137° to 170° C., yielding 1053 gr. of a hard, yellow wax. 1050 gr. of this wax were heated with 236 gr. acetic anhydride for 4 hours at 142° to 164° C. The final product was a brown wax weighing 1282.2 gr. and characterized by an acid number of 77.0. One gram of this wax could be dispersed in 10 cc. of distilled water to form a tan colored, thick, soapy solution. One gram of the final product could be dispersed in 50 cc. distilled water to yield a pale yellow, thick, soapy, silky solution having a pH of 4.00.

When tested under pressure of 200 lb. per sq. in., as described in Example I, this product was found to inhibit foaming for 44 minutes.

Example XI 1130 gr. triethylene tetramine, 1420 gr. stearic acid, and 900 gr. of glacial acetic acid were heated at from 135° to 180° C. for 6 hours, yielding a final product having an acid number of 63.8. This product was a tan colored solid at room temperature.

The product of this experiment was tested under 200 lb. per sq. in. pressure, as described in Example I, and was found to inhibit foaming for 20 minutes.

Example XII 876 gr. triethylene tetramine and 1704 gr. stearic acid were heated together at from 175° to 185° C. for 6 hours. At this time, 1080 gr. of glacial acetic acid were added and the reaction mixture was then refluxed at from 130° to 140° C. for 14 hours. Heating was thereafter continued at 150° C. for 8½ hours, acetic acid being distilled off. Finally, the reaction mixture was heated at from 175° to 185° C. under reduced pressure for 5¼ hours. The final product was characterized by an acid number of 50.9.

When tested under a pressure of 200 lb. per sq. in., as described in Example I, the final product was found to inhibit foaming for 62 minutes.

Example XIII 28.3 gr. tetraethylene pentamine, 47.2 gr. stearic acid and 78.0 gr. heptylic acid were heated for 11½ hours at about 180° C. During this period, 8.25 cc. of water and 1.75 cc. of heptylic acid were collected in a water trap attached to a reflux condenser. The product was then heated under a pressure of 6 to 7 mm. of mercury to remove excess heptylic acid. A total amount of 12.6 gr. of heptylic acid was recovered. The acid number of the final product was found to be 29.3 and the nitrogen content was found to be 8.13%.

The product was tested under 200 lb. per sq. in. pressure in the manner described in Example I and was found to inhibit foaming for 69 minutes. From my experience with the foam inhibiting properties of similar products and based upon the excellent foam inhibiting results obtained with this product, I have concluded that the primary amino groups have in this case been preferentially acylated with the stearic acid while one or more of the secondary amino groups have been acylated with the heptylic acid.

Example XIV 37.8 gr. of tetraethylene pentamine, 56.9 gr. stearic acid and 92.8 gr. of caproic acid were heated at about 180° C. for about 11½ hours under a reflux condenser provided with a water trap. At the end of this time, 10.5 cc. of water and 4 cc. of caproic acid had been collected in the water trap. The final reaction mixture was then heated at 180° C. under a pressure of 6 to 7 mm. of mercury to distill off residual caproic acid. 28.8 gr. of caproic acid were thus recovered. The final product had an acid number of 15.6 and a nitrogen content of 9.00%.

When tested under 200 lb. per sq. in. pressure, as described in Example I, the product was found to inhibit foaming for 64 minutes.

Example XV 37.8 gr. tetraethylene pentamine, 56.9 gr. stearic acid and 115.4 gr. of caprylic acid were heated together under a reflux condenser provided with a water trap at 180° C. for 11½ hours. The final product was then heated under a pressure of from 4 to 5 mm. of mercury to remove excess caprylic acid. A total amount of 25.9 gr. of caprylic acid was recovered. The final product had an acid number of 23.6 and was found to contain 7.88% nitrogen.

When tested under atmospheric pressure, as described in Example I, the final product was found to inhibit foaming for 75 minutes.

Example XVI 28.4 gr. tetraethylene pentamine and 42.7 gr. stearic acid were heated at about 180° C. for 2½ hours. 104.6 gr. of caprylic acid were then added, and heating was continued at about 180° C. for 6 hours under a reflux condenser provided with a water trap. At the end of the heating period, 8 cc. of water and 2 cc. of caprylic acid had collected in the water trap. Excess caprylic acid was removed from the reaction mixture by heating the latter to 180° C. under pressure from 13 to 15 mm. of mercury. A total of 48.1 gr. of caprylic acid was recovered. The final product was characterized by an acid number of 39.5 and a nitrogen content of 8.79%.

When tested under 200 lb. per sq. in. pressure, as described in Example I, the final product was found to inhibit foaming for 55 minutes.

Example XVII 28.4 gr. tetraethylene pentamine were heated with 42.7 gr. stearic acid for 2½ hours at about 180° C. 117 gr. of heptylic acid were added to the reaction mass which was thereafter heated at 180° C. for 6 hours under a reflux condenser provided with a water trap. During this time, 8.3 cc. of water and 1.5 cc. of heptylic acid were collected in the trap. When the heating was terminated, excess heptylic acid was removed by distillation under a pressure of 15 mm. of mercury. A total amount of 50.3 gr. of heptylic acid was recovered. The final product was characterized by an acid number of 28.5 and a nitrogen content of 8.13%.

When tested under 200 lb. per sq. in. pressure, as described in Example I, the final product was found to inhibit foaming for 62 minutes.

Example XVIII 28.3 gr. tetraethylene pentamine and 42.7 gr. stearic acid were heated at 180° C. for 2½ hours. At this time 129.8 gr. of caprylic acid were added. Heating at about 180° C. was continued for 9½ hours under a reflux condenser provided with a water trap. At the end of the reaction 7.5 cc. of water and 1.0 cc. of capyrylic acid had been collected in the trap. Excess capyrylic acid was then distilled off under a pressure of 4 to 5 mm. of mercury. A total amount of 68.6 gr. of capyrylic acid was recovered. The final product was characterized by an acid number of 29.2 and a nitrogen content of 7.78%.

The final product, when tested under 200 lb. per sq. in. pressure as described in Example I, was found to inhibit foaming for 55 minutes.

Example XIX 56.7 gr. of tetraethylene pentamine and 85.2 gr. stearic acid were heated at 150° C. for 6 hours. 91.0 gr. of the resulting product were thereafter heated with 38.7 gr. of 90% butyric acid for 37 hours at from 155° to 180° C. under a reflux condenser. An attempt was then made to remove the residual butyric acid by heating the product at 150° C. under a pressure of 10 mm. of mercury. The final product was characterized by an acid number of 4.5 and a nitrogen content of 9.23%.

When tested under 200 lb. per sq. in. pressure, as described in Example I, the product was found to inhibit foaming for 45 minutes.

Example XX 56.7 gr. of tetraethylene pentamine and 85.2 gr. stearic acid were heated at 150° C. for 6 hours. 91.0 gr. of the resulting product were heated with 58.0 gr. of 90% butyric acid under a reflux condenser for 25 hours at from 155° to 175° C. Most of the residual butyric acid was removed by distillation under pressure of 12 mm. of mercury. The final product was characterized by an acid number of 6.5 and a nitrogen content of 9.37%.

When tested under a pressure of 200 lb. per sq. in., as described in Example I, the product was found to inhibit foaming for 74 minutes.

Example XXI 56.7 gr. of tetraethylene pentamine and 85.2 gr. of stearic acid were heated together at 150° C. for 6 hours. 91.0 gr. of the resulting product were heated with 77.5 gr. of 90% butyric acid under a reflux condenser for 24 hours at from 155° to 178° C. Residual butyric acid was then removed by distillation at 170° C. at a pressure of 12 mm. of mercury. The final product was characterized by an acid number of 9.4 and a nitrogen content of 9.98%.

When tested under 200 lb. per sq. in. pressure, as described in Example I, the resulting product was found to inhibit foaming for 75 minutes.

The product of this example can be adapted for use in inhibiting foaming under atmospheric or sub-atmospheric pressure by further acylating the product with glycolic acid.

Example XXII 87.6 gr. of triethylene tetramine and 170.4 gr. of stearic acid were heated together at 180° C. for 6 hours. 60.0 gr. of the resulting product were heated with 29 gr. of 90% butyric acid at 180° C. under a reflux condenser for 15 hours. Some of the remaining butyric acid was then eliminated by heating the reaction mixture at 180° C. under a pressure of about 12 mm. of mercury. The resulting product was characterized by an acid number of 3.5 and a nitrogen content of 9.23%.

When tested under 200 lb. per sq. in. pressure, as disclosed in Example I, this product was found to inhibit foaming for 97 minutes.

Example XXIII 87.6 gr. of triethylene tetramine and 170.4 gr. of stearic acid were heated at 180° C. for 6 hours. 60.0 gr. of the resulting product were heated with 44.0 gr. of 90% butyric acid under a reflux condenser at 180° C. for 15 hours. Most of the remaining butyric acid was then removed by heating the reaction mixture at 180° C. under a pressure of about 12 mm. of mercury. The final product was characterized by an acid number of 6.9 and a nitrogen content of 9.35%.

When tested under 200 lb. per sq. in. pressure, as disclosed in Example I, the resulting product was found to inhibit foaming for 107 minutes.

Example XXIV 87.6 gr. of triethylene tetramine and 170.4 gr, of stearic acid were heated at 180° C. for 6 hours. 60.0 gr. of the resulting product were heated with 27.0 gr. of glacial acetic acid under a reflux condenser for 14 hours at 142° C. Most of the residual acid was removed by heating the reaction mixture at 150° C. under a pressure of 12 mm. of mercury. The final product was characterized by an acid number of 15.1 and a nitrogen content of 9.98%.

When tested under atmospheric pressure, as described in Example III, the resulting product was found to inhibit foaming for 35 minutes.

Example XXV 29.2 gr. of triethylene tetramine and 5.13 gr. of palmitic acid were heated at 180° C. for 6 hours. The reaction product showed an acid number of 1.53. The product was then refluxed for 14 hours with 36.0 gr. of acetic acid. Residual acetic acid was removed by distillation under a pressure of 20–30 mm. of mercury. The final polyamide product had an acid number of 2.8. When tested under atmospheric pressure, in accordance with Example III, the polyamide product inhibited foaming for 40 minutes.

Example XXVI 852 gr. of stearic acid, 180 gr. of glacial acetic acid, and 309.6 gr. of diethylene triamine were heated together to a temperature of 175° C. in 3 hours. During this period most of the liberated water distilled out of the reaction mixture. Heating was continued at 180 ± 5° C. for an additional 6 hours. The final product had an acid number of 8.7. It inhibited foaming at atmospheric conditions, as in Example III, for a period of 30 minutes, and under boiler conditions, as in Example I, for a period of 77 minutes.

Example XXVII 48.7 gr. of triethylene tetramine and 107.3 gr. of naphthenic acid (a complex mixture of relatively high molecular weight acids recovered from petroleum crudes) of acid number 179.3 were heated at 180° C. for six hours. The resulting material had an acid number of 33.4. 126.0 gr. of the product was subsequently heated with 50.4 gr. of glacial acetic acid for 14 hours at 142° C. Most of the unreacted acetic acid was then removed by distillation under a pressure of 50–60 mm. of mercury. The final product had an acid number of 60.8.

When tested under 200 lb. per sq. in. pressure, as described in Example I, the final product was found to inhibit foaming for 66 minutes.

Example XVIII 189.3 gr. of tetraethylene pentamine were heated with 280 gr. of naphthenic acid at 180° C. for 6 hours. The naphthenic acid utilized had an acid number of 200. The resulting naphthenic amide (found to be largely a naphthenic triamide) was then heated with 240 gr. of glacial acetic acid to a temperature of 180° C. to remove the water of reaction. This temperature was maintained for another 6 hours.

When tested under atmospheric pressure, as described in Example III, the final product was found to inhibit foaming for 30 minutes.

Example XXIX 73.0 gr. of triethylene tetramine were heated with 280 gr. of naphthenic acid having an acid number of 200 at a temperature of 180° C. for a period of 6 hours. The resulting naphthenic amide was heated with 60.0 gr. of acetic acid for another 6 hours at 150° C.

When tested under 200 lb. per sq. in. pressure, as described in Example I, the product was found to inhibit foaming for 74 minutes.

Example XXX 73.0 gr. of triethylene tetramine were heated with 280 gr. of naphthenic acid having an acid number of 200 for a period of 6 hours at a temperature of 180° C. The resulting naphthenic amide (found to be largely a naphthenic acid tetramide) was subsequently reacted with 112 gr. of acetic anhydride by refluxing for 6 hours. Residual acetic acid and/or acetic anhydride were removed by distillation under a pressure of 15 mm. of mercury.

When tested under atmosphere pressure, as described in Example III, the final product was found to inhibit foaming for a period greater than 30 minutes.

*Example XXXI*

73.0 gr. of triethylene tetramine were heated with 200 gr. of lauric acid for 6 hours at 180° C. The amide produced in this manner (which was found to be a lauric acid tetramide) was then heated at 150° C. with 60.0 gr. of glacial acetic acid for another 6 hours. Residual acetic acid was removed by distillation under a pressure of 20 mm. of mercury.

When tested under atmospheric pressure, as described in Example III, the final product was found to inhibit foaming for a period of 9 minutes.

*Example XXXII*

139.2 gr. of "Mixed Amines" (a complex by-product of the polyalkylene polyamine process comprising a mixture of polyamines averaging about 10 amino groups and 8 ethylene groups to the molecule) were heated with 560 gr. of naphthenic acid having an acid number of 200 at a temperature of 180° C. for a period of 6 hours. The resulting naphthenic amide was subsequently heated with 120.0 gr. of glacial acetic acid for another 6 hours at 150° C. The foregoing weights of respective reactive ingredients are substantially in the mol ratio of 1:5:5.

When tested under atmospheric pressure, as described in Example III, the final product was found to inhibit foaming for 25 minutes.

*Example XXXIII*

43.8 gr. of triethylene tetramine and 85.8 gr. of stearic acid were mixed in a flask and heated rapidly to 180° C. ±5° C. for a total of 6 hours. The reactants were then cooled to 100° C. when 100.3 gr. of 70% aqueous glycolic acid was added, after which the mixture was gradually heated over a period of 6 hours to 180° C. and held at that temperature for 10½ hours. The resulting free acid content was 8%. The final product is a hard, brown colored wax-like solid, easily soluble in ethanol and dispersible in water.

When tested under atmospheric pressure, as described in Example III, the final product was found to inhibit foaming for 20 minutes.

*Example XXXIV*

To a mixture of 58.5 gr. soybean oil and 19.5 gr. tetraethylene pentamine, 15.8 gr. acetic anhydride was added, causing the temperature to rise from 27° to 109° C. A heavy precipitate formed when the temperature dropped. The contents were then warmed to 140° C. in the course of 2 hours. Subsequently, the cloudy, oily mass was agitated at 140° to 150° C. over a period of 8 hours. The reaction product was a brown, oily paste mixture with an acid number of 16.5.

Tested under atmospheric pressure with foaming ocean water concentrated to ⅓ volume, ¼ part per million of the reaction product inhibited foaming for over 40 minutes.

The specific compositions described hereinabove and the other foam inhibiting compositions of the present invention may be introduced into steam boiler water in the form of colloidal dispersions that may be stabilized with tannin, gum arabic, pectin, or the like. If desired, the foam inhibiting compositions may be introduced into the boiler in the form of a solution in an appropriate solvent, such as ethyl alcohol, isopropyl alcohol or the like. The dosages required are generally quite small, on the order of a few parts per million of boiler water. In general, from 0.1 to about 50 parts per million of foam inhibiting compound may be added to boiler water, preferably in combination with tannin. Addition of foam inhibiting compounds may be repeated as required to prevent foaming.

In all of the products made in accordance with the preceding examples the primary amino groups will be found to be acylated with a fatty acid of at least 12 carbon atoms, and at least one of the secondary amino groups will be found to be acylated with a fatty acid containing from 2 to 10 carbon atoms. Those products that have been acylated in the secondary amino groups with fatty acids having 2 carbon atoms, such as acetic acid or glycolic acid, have been found to be particularly well suited for use in inhibiting foam formation not only in boiler waters for the generation of steam at atmospheric or sub-atmospheric pressures but also in other aqueous systems such as cooling systems of diesel and other internal combustion engines and in process industries, such as in paper making, where foaming is a problem.

Many details in composition and procedure may be varied through a wide range without departing from the principles of the invention, and it is, therefore, not my purpose to limit the patent granted on this invention otherwise than necessitated by the scope of the appended claims.

This application is a continuation-in-part of my application, Serial No. 458,142, filed September 12, 1942, now United States Patent No. 2,461,730 issued on February 15, 1949.

I claim as my invention:

1. The method of inhibiting foaming in an aqueous system having a tendency to foam, which comprises dispersing into said aqueous system a substance consisting essentially of a polyethylene polyamine acylated in both its primary amino groups with a carboxylic acid containing at least 12 carbon atoms and also acylated in at least one secondary amino group with a carboxylic acid containing from 2 to 10 carbon atoms, said substance being dispersed in said aqueous system in an amount sufficient substantially to inhibit the tendency of said aqueous system to foam.

2. The method of inhibiting foaming in an aqueous system having a tendency to foam, which comprises dispersing into said aqueous system a substance consisting essentially of a polyethylene polyamine acylated in both its primary amino groups with a carboxylic acid containing at least 16 carbon atoms and also acylated in at least one secondary amino group with a fatty acid having 2 carbon atoms, said substance being dispersed in said aqueous system in an amount sufficient substantially to inhibit the tendency of said aqueous system to foam.

3. The method of inhibiting foaming in an aqueous system having a tendency to foam, which comprises dispersing into said aqueous system a substance consisting essentially of a polyethylene polyamine acylated in both its primary amino groups with a carboxylic acid containing at least 16 carbon atoms and also acylated in at least one secondary amino group with acetic acid, said substance being dispersed in said aqueous system in an amount sufficient substantially to inhibit the tendency of said aqueous system to foam.

4. The method of inhibiting foaming in an aqueous system having a tendency to foam, which comprises dispersing into said aqueous system a substance consisting essentially of a polyethylene polyamine acylated in both its primary amino groups with a carboxylic acid containing at least 16 carbon atoms and also acylated in at least one secondary amino group with glycolic acid, said substance being dispersed in said aqueous system in an amount sufficient substantially to inhibit the tendency of said aqueous system to foam.

5. The method of generating steam from a boiler water having a tendency to foam on boiling, which comprises dispersing into said water in an amount sufficient to inhibit said tendency, a polyethylene polyamine acylated in both its primary amino groups with a carboxylic acid containing at least 12 carbon atoms and also acylated in at least one secondary amino group with a carboxylic acid containing from 2 to 10 carbon atoms, and boiling the resulting aqueous dispersion.

6. The method of generating steam from a boiler water having a tendency to foam on boiling, which comprises dispersing into said water in an amount sufficient to inhibit said tendency, a polyethylene polyamine acylated in both its primary amino groups with a carboxylic acid containing at least 12 carbon atoms and also acylated in at least one secondary amino group with a carboxylic acid containing 2 carbon atoms, and boiling the resulting aqueous dispersion.

7. The method of generating steam from a boiler water having a tendency to foam on boiling, which comprises dispersing into said water in an amount sufficient to inhibit said tendency, a polyethylene polyamine acylated in both its primary amino groups with a carboxylic acid containing at least 12 carbon atoms and also acylated in at least one secondary amino group with acetic acid, and boiling the resulting aqueous dispersion.

8. The method of generating steam from a boiler water having a tendency to foam on boiling, which comprises dispersing into said water an effective amount of a polyethylene polyamine acylated in both its primary amino groups with a carboxylic acid containing at least 12 carbon atoms and also acylated in at least one secondary amino group with glycolic acid, and boiling the resulting aqueous dispersion.

9. The method of generating steam from a boiler water having a tendency to foam on boiling, which comprises dispersing into said water an effective amount of a polyethylene polyamine acylated in both its primary amino groups with a fatty acid containing at least 16 carbon atoms and also acylated in at least one secondary amino group with a fatty acid containing 2 carbon atoms, and boiling the resulting aqueous dispersion.

10. The method of generating steam from a boiler water having a tendency to foam on boiling, which comprises dispersing into said water an effective amount of a polyethylene polyamine acylated in both its primary amino groups with a fatty acid containing at least 16 carbon atoms and also acylated in at least one secondary amino group with acetic acid, and boiling the resulting aqueous dispersion.

11. The method of generating steam from a boiler water having a tendency to foam on boiling, which comprises dispersing into said water an effective amount of a polyethylene polyamine acylated in both its primary amino groups with a fatty acid containing at least 16 carbon atoms and also acylated in at least one secondary amino group with glycolic acid, and boiling the resulting aqueous dispersion.

12. The method of generating steam from a boiler water having a tendency to foam on boiling, which comprises dispersing into said water a substance consisting essentially of triethylene tetramine acylated in both its primary amino groups with stearic acid and with at least one secondary amino group acylated with a fatty acid containing from 2 to 10 carbon atoms, said substance being dispersed in said water in an amount sufficient substantially to inhibit the tendency of said water to foam on boiling, and boiling the resulting aqueous dispersion.

13. The method of generating steam from a boiler water having a tendency to foam on boiling, which comprises dispersing into said water a substance consisting essentially of triethylene tetramine acylated in its primary amino groups with stearic acid and acylated in at least one secondary amino group with butyric acid, said substance having dispersed into said water in an amount sufficient substantially to inhibit the tendency of said water to foam on boiling, and boiling the resulting aqueous dispersion.

14. The method of generating steam from a boiler water having a tendency to foam on boiling, which comprises dispersing into said water a substance consisting essentially of a polyethylene polyamine acylated in both its primary amino groups with a fatty acid containing at least 16 carbon atoms and acylated in at least one secondary amino group with a fatty acid containing from 2 to 10 carbon atoms, said substance being dispersed in said water in an amount sufficient substantially to inhibit the tendency of said water to foam on boiling, and boiling the resulting aqueous dispersion.

15. The method of generating steam from a water having a tendency to foam on boiling, which comprises dispersing into said water a substance consisting essentially of triethylene tetramine acylated in both its primary amino groups with stearic acid and acylated in at least one secondary amino group with acetic acid, said substance being dispersed into said water in an amount sufficient substantially to inhibit the tendency of said water to foam on boiling, and boiling the resulting aqueous dispersion.

LEWIS O. GUNDERSON.

REFERENCES CITED

The following references are of record in the file of this patent:

UNITED STATES PATENTS

| Number | Name | Date |
| --- | --- | --- |
| 2,243,980 | Rheiner et al. | June 3, 1941 |
| 2,345,632 | Robinson et al. | Apr. 4, 1944 |
| 2,347,178 | Fritz et al. | Apr. 25, 1944 |
| 2,363,923 | Denman | Nov. 28, 1944 |

FOREIGN PATENTS

| Number | Country | Date |
| --- | --- | --- |
| 568,510 | Great Britain | Apr. 9, 1945 |